UNITED STATES PATENT OFFICE.

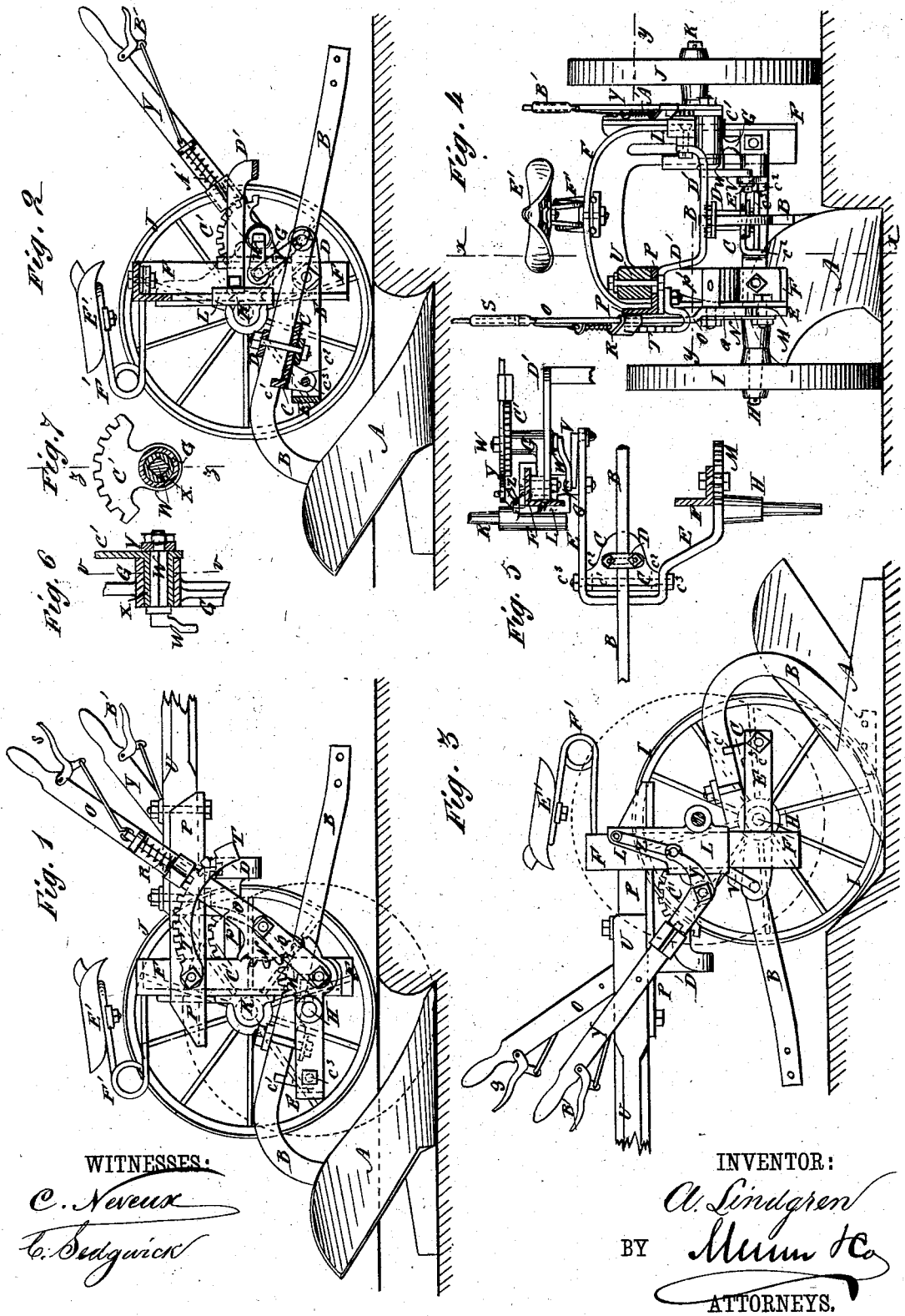

AUGUST LINDGREN, OF MOLINE, ILLINOIS.

SULKY-PLOW.

SPECIFICATION forming part of Letters Patent No. 224,195, dated February 3, 1880.

Application filed June 28, 1879.

*To all whom it may concern:*

Be it known that I, AUGUST LINDGREN, of Moline, in the county of Rock Island and State of Illinois, have invented a new and useful Improvement in Sulky-Plows, of which the following is a specification.

Figure 1 is a side view of my improved plow, one of the wheels being removed. Fig. 2 is a vertical longitudinal section of the same, taken through the line $x\,x$, Fig. 4. Fig. 3 is a side view of the same, showing the reverse side from that shown in Fig. 1, one of the wheels being removed. Fig. 4 is a front view of the same, the tongue and its support being shown in cross-section. Fig. 5 is a detail top view of some of the parts of the same, partly in section, through the broken line $y\,y$, Fig. 4. Fig. 6 is a detail section of the pivoting parts of the left-hand lever, taken through the line $z\,z$, Fig. 7. Fig. 7 is a detail section of the same, taken through the line $v\,v$, Fig. 6.

Similar letters of reference indicate corresponding parts.

The object of the invention is to provide means whereby the plow and furrow-wheel may be simultaneously lifted, as hereinafter described, and the land-side wheel worked independently of the plow.

A represents the plow, and B is the plow-beam, to the forward end of which the draft is applied. The rear part of the beam B rests upon a plate, C, to which it is secured by a clamp, D. The rear edge of the plate C has an upwardly-projecting flange, $c'$, formed upon it, which is notched to receive the beam B to still further secure the said beam in place. The rear parts of the side edges of the plate C have downwardly-projecting lugs $c^2$ formed upon them to receive the bolt $c^3$, by means of which the said plate C, and with it the plow A B, is pivoted to the bar E a little in front of its bend, as shown in Fig. 5.

The arm of the bar E, upon the furrow side, is made with an outward offset, and is pivoted at the lower part of its forward end to the lower end of the arm of the arched bar F. The other arm of the bent bar E is pivoted near its forward end to a block, G, attached to the lower part of the land-side arm of the arched bar F. To the furrow-side arm of the bent bar E is attached, or upon it is formed, the axle H, upon which the furrow-wheel I revolves.

The land-side wheel J revolves upon an axle, K, attached to or formed upon a slide, L, that slides up and down upon the lower part of the land-side arm of the arched bar F. The arched bar F is made of angle-iron to give it the requisite strength and at the same time allow it to be made light.

The end of the furrow-side arm of the bent bar E has a segment of a gear-wheel, M, formed upon it, the teeth of which mesh into the teeth of the segment of a gear-wheel, N, formed upon or attached to the lower end of the lever O. The lever O is pivoted at a little distance from its lower end to a pivot attached to or formed upon the brace $p'$ of the tongue-support P.

Q is a brace-strap, one end of which is placed upon the pivot of the lever O, and its other end is placed upon the pivot of the end of the bent bar E. The lever O passes up across the tongue-support P and is provided with a spring sliding pawl, R, which is operated by a small bent lever, S, pivoted to the upper part of the said lever O. The pawl R engages with the notches of the curved catch-bar T, the ends of which are attached to the tongue-support P. The rear ends of the tongue-support P and its brace $p'$ are bolted to the furrow-side arm of the arched bar F. The tongue-support P is made of angle-iron, to give it sufficient strength while allowing it to be made light, and to its forward part is secured, by two bolts, the rear end of the tongue U, the forward bolt passing through a cross-slot in the support P to allow the tongue U to be adjusted as may be desired.

To the end of the land-side arm of the bent bar E is pivoted the lower end of a short connecting-bar V, the upper end of which is pivoted to the end of a crank, W, the shaft of which is made square and passes through the square cavity of the sleeve X. The sleeve X passes through and works in a bearing formed upon the block G.

To the outer end of the crank-shaft W is pivoted the lever Y near its lower end. The lower end of the lever Y is curved to the rearward, and to it is pivoted the lower end of a short connecting-rod, Z, the upper end of which is pivoted to the upper part of the slide L, so that the said slide may be raised and lowered, to raise and lower the land-side wheel J, by operating the said lever Y. The lever Y is provided with a spring-pawl, A', which is operated by a small bent lever, B', pivoted to the upper part of the said lever Y. The pawl A' engages with a notched segment or catch plate, C', formed upon or rigidly attached to the outer end of the sleeve X.

D' is a bent brace-bar, one end of which is bolted to the block G, and its other end is bolted to the tongue-support P. The brace-bar D' thus strengthens the frame of the machine, and also acts as a stop or fulcrum for the plow-beam B to strike against when the plow is being raised.

With this construction by operating the lever Y the land-side wheel J will be raised and lowered independently of the plow to level the sulky, and by operating the lever O the plow may be raised from the ground or adjusted to work at any desired depth in the ground, the land-side wheel being lowered and raised at the same time and by the same operation.

E' is the driver's seat, which is adjustably bolted to the upper arm of the spring F', so that it may be moved forward or back to cause the driver's weight to properly balance the machine. The lower arm of the spring F' is adjustably secured to the upper part of the arched bar F.

Having thus described my invention, I claim as new and desire to secure by Letters Patent—

1. In a sulky-plow, the combination, with a hand-lever, O, having toothed segment at lower end, of the bar E, pivoted near its forward end to bar F, provided with the furrow-wheel axle H, and having the toothed segment M, the axis of the furrow-wheel being distinct from that of the segment and in the rear thereof, as shown and described, whereby the furrow-wheel and segment are lifted together.

2. The combination of the connecting-bar V, the crank W, and the sleeve X with the bent bar E, the block G of bar F, the catch-plate C', the lever Y, and the slide L, that carries the axle of the land-side wheel, as shown and described.

AUGUST LINDGREN.

Witnesses:
   GUSTAF SWENSSON,
   S. S. STROMMENTS.